US010393767B2

(12) United States Patent
Khaira et al.

(10) Patent No.: US 10,393,767 B2
(45) Date of Patent: Aug. 27, 2019

(54) SINGLE SENSOR SYSTEMS AND METHODS FOR DETECTION OF REVERSE ROTATION

(71) Applicants: Niran Singh Khaira, Spring, TX (US); Richard A. Huntington, Spring, TX (US)

(72) Inventors: Niran Singh Khaira, Spring, TX (US); Richard A. Huntington, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 582 days.

(21) Appl. No.: 15/013,563

(22) Filed: Feb. 2, 2016

(65) Prior Publication Data
US 2016/0274140 A1    Sep. 22, 2016

Related U.S. Application Data

(60) Provisional application No. 62/134,844, filed on Mar. 18, 2015.

(51) Int. Cl.
*G01P 13/04* (2006.01)
*G01D 5/30* (2006.01)

(52) U.S. Cl.
CPC .............. *G01P 13/04* (2013.01); *G01D 5/30* (2013.01)

(58) Field of Classification Search
CPC .......... G01P 13/02; G01P 13/04; G01D 5/30; G01D 5/3473; G01D 5/34707; G01D 5/34715; G01D 5/347; G01D 5/342; G01D 5/34; G01D 5/32
See application file for complete search history.

(56) References Cited

U.S. PATENT DOCUMENTS

| 3,569,927 A | | 3/1971 | Guyton et al. ................. 340/56 |
| 4,103,155 A | * | 7/1978 | Clark ................. G01D 5/34784 250/214 PR |
| 4,314,760 A | * | 2/1982 | Hodge ................... G01D 5/268 250/227.11 |
| 4,320,293 A | | 3/1982 | Guretzky ...................... 250/231 |
| 4,500,870 A | * | 2/1985 | Krohn ..................... G01D 5/30 250/231.13 |
| 4,679,029 A | * | 7/1987 | Krohn .................... H03M 1/24 250/231.1 |

(Continued)

FOREIGN PATENT DOCUMENTS

| DE | 4232864 | 3/1994 | ............ G01D 5/249 |
| DE | 19839281 | 3/2000 | ............ G01B 11/00 |

(Continued)

*Primary Examiner* — John R Lee
(74) *Attorney, Agent, or Firm* — ExxonMobil Upstream Research Company—Law Department

(57) ABSTRACT

Systems, methods, and apparatuses for detecting a direction of rotation of a rotatable object are disclosed herein. An apparatus includes a sensor having a sensing field and being disposed so that the object is within the sensing field, the sensor being configured to detect variations in measured characteristics of the object as the object rotates, and generate a signal based on the detected variations in measured characteristics. The apparatus also includes a computing system configured to receive the signal from the sensor and to determine a direction of rotation of the object about the axis based on the signal.

19 Claims, 5 Drawing Sheets

(56) References Cited

U.S. PATENT DOCUMENTS

| | | | | |
|---|---|---|---|---|
| 4,879,555 A * | 11/1989 | Ichikawa | ............ | F15B 15/2846 250/231.13 |
| 4,928,008 A * | 5/1990 | Huggins | ................. | G01D 5/34 250/214 PR |
| 5,001,937 A * | 3/1991 | Bechtel | ..................... | G01L 3/12 250/231.14 |
| 5,061,952 A | 10/1991 | Ogawa | ......................... | 354/400 |
| 5,214,278 A * | 5/1993 | Banda | .................... | G01D 5/268 250/231.13 |
| 5,243,187 A * | 9/1993 | Hettlage | .............. | G01D 5/2451 250/231.16 |
| 5,253,531 A * | 10/1993 | Walker | .................. | G01H 1/003 250/237 G |
| 5,319,196 A * | 6/1994 | Cleven | .................. | G01D 5/268 250/227.11 |
| 5,471,054 A * | 11/1995 | Watanabe | .......... | G01D 5/24452 250/231.13 |
| 5,748,111 A * | 5/1998 | Bates | ..................... | G01D 5/347 250/231.14 |
| 5,864,058 A | 1/1999 | Chen | ........................ | 73/152.47 |
| 5,900,930 A * | 5/1999 | Simon | ................. | G01D 5/2497 250/231.13 |
| 6,205,851 B1 | 3/2001 | Jogi | ............................ | 73/152.47 |
| 6,498,474 B1 * | 12/2002 | Turner | .................. | G01D 5/145 324/165 |
| 6,538,426 B1 * | 3/2003 | Enrietto | ................. | G01D 5/145 324/165 |
| 6,586,719 B1 * | 7/2003 | Bartzke | ................... | G01D 5/34 250/214 PR |
| 6,974,949 B2 * | 12/2005 | Orrico | ..................... | G01D 5/34 250/214 PR |
| 7,456,529 B2 * | 11/2008 | Faizullabhoy | ..... | G01D 5/34746 310/12.19 |
| 7,503,403 B2 | 3/2009 | Jogi et al. | ....................... | 175/45 |
| 7,545,518 B2 * | 6/2009 | Heyworth | ............ | G01D 5/3473 356/620 |
| 8,018,224 B2 | 9/2011 | Kurumado | ............... | 324/207.25 |
| 8,042,412 B2 * | 10/2011 | Xia | ........................ | G01H 9/004 73/650 |
| 8,376,065 B2 | 2/2013 | Teodorescu et al. | ........... | 175/40 |
| 8,528,636 B2 | 9/2013 | Brooks | ...................... | 166/255.1 |
| 8,818,779 B2 | 8/2014 | Sadlier et al. | .................. | 703/10 |
| 2008/0158039 A1 * | 7/2008 | Kassner | ............... | G01D 5/2457 341/182 |
| 2009/0072129 A1 * | 3/2009 | Okada | ..................... | G01D 5/36 250/229 |
| 2010/0106452 A1 * | 4/2010 | Tatenuma | ............ | G01D 5/2451 702/150 |
| 2012/0262160 A1 * | 10/2012 | Michalski, Jr. | ........ | G01D 5/246 324/207.25 |
| 2013/0245950 A1 | 9/2013 | Jain et al. | ........................ | 702/9 |
| 2014/0092396 A1 * | 4/2014 | Hopp | ..................... | G01B 11/14 356/615 |
| 2016/0274140 A1 * | 9/2016 | Khaira | .................... | G01D 5/30 |
| 2017/0234702 A1 * | 8/2017 | Tima | .................... | G01D 5/2013 324/207.25 |

FOREIGN PATENT DOCUMENTS

| | | | | |
|---|---|---|---|---|
| EP | 1070964 | 9/2010 | ............ | F02D 41/22 |
| EP | 1878897 | 8/2014 | ............ | F02D 41/06 |

* cited by examiner

SINGLE SENSOR SYSTEMS AND METHODS FOR DETECTION OF REVERSE ROTATION

CROSS REFERENCE TO RELATED APPLICATIONS

This application claims the priority benefit of U.S. Patent Application 62/134,844 filed Mar. 18, 2015 entitled SINGLE SENSOR SYSTEMS AND METHODS FOR DETECTION OF REVERSE ROTATION, the entirety of which is incorporated by reference herein.

FIELD OF THE INVENTION

This disclosure relates to systems and methods for detecting a direction of rotation of an object about its axis. More particularly, this disclosure relates to systems and methods for detection of reverse rotation of rotating objects such as shafts and other drive train objects to help prevent significant damage to equipment. Many of the systems and methods disclosed herein use a single sensor for detecting a direction of rotation.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Systems that deliver power from a driver, such as a motor, gas turbine, steam turbine, hydraulic turbine, gearbox or similar device, to one or more other components, such as a compressor, pump, gearbox or similar device, typically include an object for power delivery such as a shaft. The shaft has a direction of rotation about an axis that results in normal operation of the power delivery system. In some situations, failure of a valve, check valve, non-return valve or other component will result in the shaft reversing its direction of rotation, especially following the shutdown of a driver. Reverse rotation can cause extensive damage to a machinery drive train, including as examples seal failure, bearing damage (e.g. if lubrication system is not ready), reverse power (generator units) and in some cases, overspeed and catastrophic unit failure. The ability to detect a direction of rotation can be important to potentially avoid significant damage to equipment by detecting when the direction of rotation reverses and possibly taking further action.

Conventional techniques for detection of reverse rotation use multiple sensors and/or complex configurations of reference devices on/attached to a shaft and/or uses pulse/reference counting devices/mechanisms (e.g. Kurumado in U.S. Pat. No. 8,018,224, Ishikawa in EP1878897, or Rupp in EP1070964). Other conventional techniques include use of an audible device such as a whistle to warn of a reverse rotation of a pump, fan or other rotating equipment. Such an audible device may be mounted onto or integrated with the pump, fan or other rotatable object and make an audible signal or alert sound if and only if the pump, fan or other rotatable object is rotating in a direction that is opposite its normal direction of rotation. The volume of the signal or alert sound is set to be sufficient to identify the reverse rotation to plant personnel so that corrective action may be executed. These systems may be ineffective and can be costly to implement and/or not amenable to retrofitting onto existing machinery for detection of reverse rotation. There is therefore a need for improved systems that accurately determine the direction of rotation in ways that reduce cost and complexity.

SUMMARY

An embodiment provides an apparatus for determining a direction of rotation of a rotatable object about an axis. In an embodiment, the rotatable object is cylindrical in form. However any object that may rotate about an axis can be used, including but not limited to regular shapes such as elliptical, triangular, square, pentagonal, etc. or irregularly shaped rotating objects. The apparatus includes a sensor having a sensing field and being disposed so that the object is within the sensing field. The sensor is configured to detect variations in optical characteristics of the object as the object rotates, and generate a signal based on the detected variations in optical characteristics. The apparatus further includes a computing system configured to receive the signal from the sensor and to determine a direction of rotation of the object about the axis based on the signal.

Another embodiment provides a method for determining a direction of rotation of a rotatable object. The method includes detecting, by a sensor, an image with variations in optical characteristics disposed on a rotatable object, wherein the optical sensor is positioned to detect the variations in optical characteristics of the at least one image as the object rotates. The method further includes generating, by the sensor, a signal indicating variations in optical characteristics of the at least one image as the object rotates. The method further includes receiving the signal from the optical sensor at a computing system, and determining, by the computing system, the direction of rotation of the object based on the received signal. In an embodiment, the rotatable object is cylindrical in form.

Another embodiment provides a reverse rotation detection apparatus. The apparatus includes a rotatable object having a surface whose height with respect to an axis of rotation varies radially in a portion of the surface, wherein the portion of the surface comprises a gradient between a first height and a second height, and wherein the gradient is oriented along the circumference of the object. The apparatus further includes a sensor positioned to generate a signal indicative of the distance between the sensor and the surface of the object as the object rotates. The apparatus further includes a computing system configured to receive the signal from the sensor and configured to determine a direction of rotation of the object based on a pattern of differences in distance between the sensor and the surface of the object as the object rotates, as indicated by the signal. In an embodiment, the object is cylindrical in form.

Another embodiment provides a reverse rotation detection apparatus. The reverse rotation detection apparatus includes a rotatable object having a surface comprising a first feature and a second feature, wherein the first feature and the second feature are aligned in a cross section of the object and located on a surface of the shaft less than 180 degrees apart in the cross section, and wherein a distance between the first feature and the sensor when the first feature is in a field of measurement of the sensor is different than a distance between the second feature and the sensor when the second feature is in a field of measurement of the sensor. The reverse rotation detection apparatus further includes a sensor positioned to generate a signal indicative of the distance between the sensor and the surface of the object as the object rotates. The reverse rotation detection apparatus further includes a computing system configured to receive the signal from the displacement sensor and configured to determine a direction of rotation of the object based on a pattern of differences in distance between the sensor and the surface of the object as the object rotates, as indicated by the signal. In an embodiment, the object is cylindrical in form.

BRIEF DESCRIPTION OF THE DRAWINGS

The advantages of the present techniques are better understood by referring to the following detailed description and the attached drawings, in which.

DETAILED DESCRIPTION OF THE DRAWINGS

In the following detailed description section, specific embodiments of the present systems, devices, and techniques are described. However, to the extent that the following description is specific to a particular embodiment or a particular use of the present systems, devices, and techniques, this is intended to be for exemplary purposes only and simply provides a description of the exemplary embodiments. Accordingly, the systems, devices, and techniques are not limited to the specific embodiments described below, but rather, include all alternatives, modifications, and equivalents falling within the spirit and scope of the appended claims.

At the outset, for ease of reference, certain terms used in this application and their meanings as used in this context are set forth. Further, the present systems, devices, and techniques are not limited by the usage of the terms shown below, as all equivalents, synonyms, new developments, and terms or systems, devices, and techniques that serve the same or a similar purpose are considered to be within the scope of the present claims.

As used herein, a "displacement sensor" is a device that provides an output related to the distance between the device and a surface of a rotating object wherein the output varies in time as this distance changes with rotation of the object.

As used herein, an "optical sensor" is a device that provides an output related to the color, shade, intensity, luminescence, contrast or similar characteristic of a surface of a rotating object wherein the output varies in time as the object rotates.

As used herein, a "magnetic sensor" is a device that provides an output related to the magnetic or other field strength emanating from a surface of a rotating object wherein the output varies in time as the object rotates.

As used herein, "sensor" may refer to a displacement sensor, optical sensor, magnetic sensor, or other type of sensor that provides an output related to some property or characteristic of a rotatable object or surface of the rotatable object wherein the output may vary in time as the object rotates.

Figure 1:
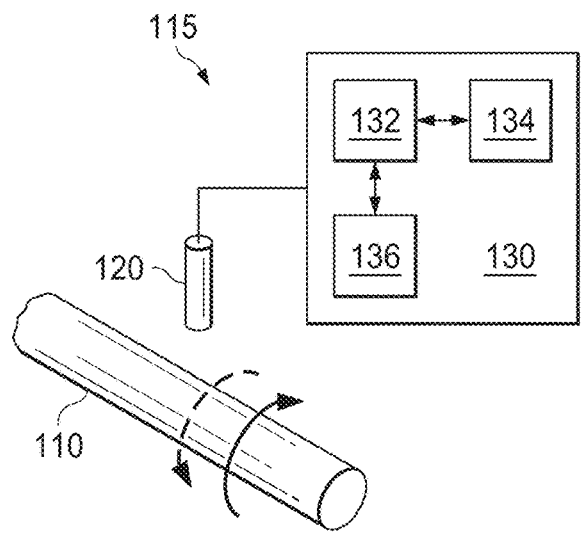
FIG. 1 is a schematic representation of an exemplary system for detecting direction of rotation of a shaft in accordance with one exemplary aspect of the present disclosure.

FIG. 1 is a schematic representation of an exemplary system 115 for detecting direction of rotation of a shaft 110. The exemplary system 115 includes a sensor 120 coupled to a computing system 130. The sensor 120 is a type of sensor capable of taking measurements that are used by the computing system to determine direction of rotation of the shaft 110. Although not shown in FIG. 1, the shaft 110 has characteristics that make it possible for the sensor 120 to produce such measurements. Various types of characteristics of the shaft that lend themselves to detecting a direction of rotation about an axis are described further below. The sensor 120 produces a signal based on a detected characteristic of the shaft 110 in an area of the shaft 110 proximate to the sensor 120. Exemplary sensors 120 include displacement detection by means of non-contact magnetic, capacitive, proximity, radar, radiation detection, or the like. Alternatively, exemplary sensors 120 may include optic detection by means of radar, radiation detection, intensity, color, shade, luminescence, contact, or the like. Exemplary sensors 120 may also include contact sensors or other types of sensors.

A shaft 110 is used herein as a representative cylindrical object for which a direction of rotation is of interest. However, the methods and apparatuses described herein apply to detect a direction of rotation of any object, such as any type of rotating assembly or device in a machine.

The computing system 130 is configured to receive a signal from the sensor 120 to determine a direction of rotation. The direction of rotation may be clockwise or counterclockwise as indicated by the solid and dashed arrows, respectively. In this embodiment, the computing system 130 includes a communication device 136 configured to receive signals from the sensor 120. The communication device 136 can be any known device for receiving a signal. The communication device 136 may receive signals for the sensor via wired or wireless communication technologies or methods as known in the art. These may include WiFi, Bluetooth, direct connection, local and wide area networking, the Internet, or other connection networks.

The computing system further includes a processor 132 and a memory device 134. The processor 132 may be implemented using hardware or a combination of hardware and software. Although illustrated as a single processor, the processor 132 is not so limited and may comprise multiple processors. The processor 132 may be implemented as one or more processors, e.g., as one or more central processing unit (CPU) chips, cores (e.g., a multi-core processor), field-programmable gate arrays (FPGAs), and/or application specific integrated circuits (ASICs). The processor 132 is coupled to the communication device 136 and the memory device 134.

The memory device 134 may include a computer-readable medium, such as any combination of random access memory (RAM), a read-only memory (ROM), and secondary storage. The RAM may be static RAM, dynamic RAM, or the like, and the ROM may be programmable ROM (PROM), erasable PROM (EPROM), electrically EPROM (EEPROM), or the like. The secondary storage may be used to store programs that are loaded into the RAM when such programs are selected for execution. ROM may be used to store instructions and perhaps data that are read during program execution. ROM is a non-volatile memory device that typically has a small memory capacity relative to the larger memory capacity of the secondary storage. RAM may be used to store volatile data and perhaps to store instructions. The memory device 134 may contain instructions for performing any of the methods discussed herein.

The computing system 130 may be configured to communicate with equipment coupled to shaft 110 for delivering power via the shaft 110. In one exemplary embodiment, for example, a motor is used to provide power to another component via the shaft 110. If the computing system 130 detects a reverse rotation condition, the computing system 130 may provide a signal to the motor to shut down power to the motor so that any damage to equipment coupled to the shaft 110 is not significant.

In an embodiment, the computing system 130 may further include a display device (not shown), such as a screen, a flashing light emitting diode, or other visual indicator, for displaying indications of shaft rotation. A viewer viewing the display device may take action to operate any power generating equipment, such as a motor mentioned above, attached to the shaft 110 to shut down the power and/or to isolate the equipment, such as by closing a valve, and thereby remove or reduce the force, flow, energy or similar characteristic that may cause a reverse rotation and/or to prevent significant damage to the equipment. Said actions may alternatively be taken automatically by the computing system 130 also, either immediately or after a fixed or selectable time delay. Furthermore, the computing system 130 may further include a speaker or other audio device for emitting an alarm when reverse rotation is detected.

Figure 2:
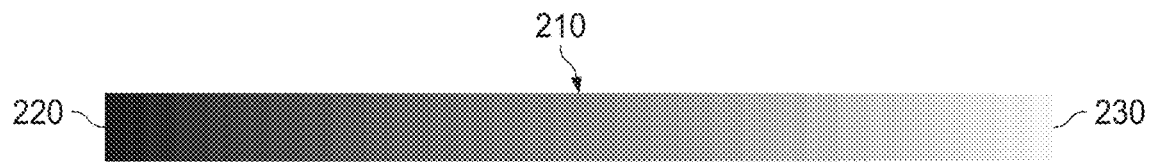
FIG. 2 illustrates an exemplary grayscale image used in a rotation detection apparatus in accordance with one exemplary aspect of the present disclosure.

FIG. 2 illustrates an exemplary graduated grayscale image 210. The graduated grayscale image is darker at an end 220 and gradually lightens toward end 230, such that the ends provide a stark contrast in the degree of grayscale. The graduated grayscale image 210 may be attached along a circumference of a shaft, such as shaft 110, to facilitate detection of direction of rotation of the shaft. The image 210 represents a number of degrees of a shaft when attached along a circumference of the shaft. For example, if the image 210 wraps completely around the shaft 110, the two ends 220 and 230 meet and cover 360 degrees of the shaft 110. However, the image 210 can be placed so as to circumscribe only a portion of the circumference of a shaft, such as 50 degrees, 100 degrees, 120 degrees, etc. of the circumference.

Further, the gray scale image of FIG. 2 illustrates use of image intensity alone since the gray scale variations only change the intensity of the black vs. white image. Embodiments can also use variations of intensity for other colors, such as blue, red or green. In addition, color gradation from red to blue or blue to green or green to red are examples of using the frequency of the emitted or reflected light as an optical characteristic that may be sensed to indicate the direction of rotation of an object. As such, examples using gray scale discussed herein should be considered to also encompass other color frequency and intensity variations.

Figure 3:
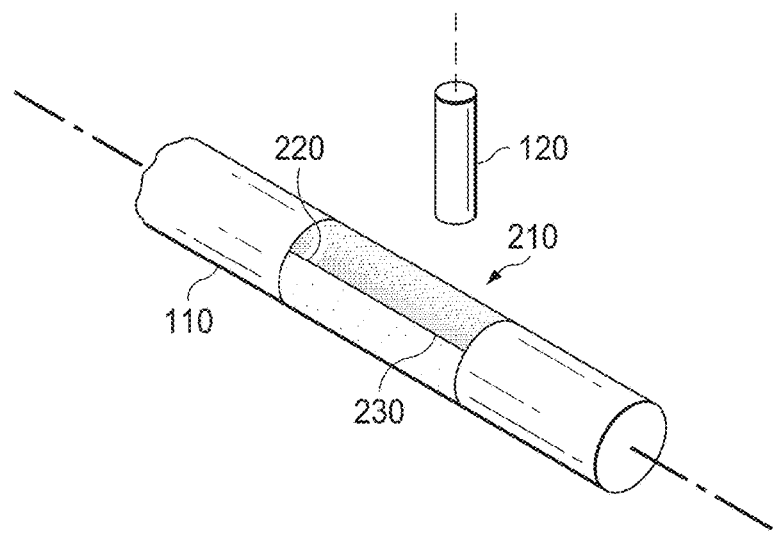
FIG. 3 illustrates an exemplary embodiment of a system for detecting direction of rotation in accordance with one exemplary aspect of the present disclosure.

Use of the grayscale image 210 is illustrated further in FIG. 3. In this exemplary embodiment, the grayscale image 210 is attached to the shaft 110 as shown. The grayscale image 210 occupies a full 360 degrees of the circumference of the shaft 110 such that the two ends 220 and 230 come together as shown. The image 210 may be secured about the circumference of the shaft via an adhesive or glue or other means of attachment or application. In one embodiment, the image 210 is printed, affixed to, or otherwise disposed on a sticker that may be temporarily or permanently attached about the circumference of the shaft.

In the configuration in FIG. 3, the sensor 120 may be any sensor capable of determining a feature color or grayscale change during rotation of the shaft 110. For example, the sensor 120 may be a camera or other type of optical or vision sensor positioned to measure a shading of a portion of the image 210 directly underneath the sensor 120. As the shaft 110 rotates, the portion of the image 210 detected by the sensor changes and therefore a measurement of shading changes as the shaft 110 rotates. An increasing or decreasing color intensity trend over time can be used to indicate direction of rotation. For example, as the shaft 110 rotates in a clockwise direction the black intensity of the image 210 decreases over time until there is an abrupt increase or step change increase at the boundary between ends 220 and 230 and the cycle starts again. Gradual increases in black intensity over time indicate a reversal in rotation, that is, that the shaft is rotating in the counter-clockwise direction.

The grayscale image 210 in FIG. 2 is an exemplary image in which there is a gradient in shading between a first level of shading (e.g., at end 220) and a second level of shading (e.g., at end 230). In an embodiment, the sensor 120 determines changes in shading (darker to lighter or lighter to darker) to determine a direction in rotation.

If the image 210 is sized such that it circumscribes only a portion of the circumference of the shaft 110, the sensor 120 will produce a signal that shows gradual increases or decreases in shading or darkness over time over only part of the duty cycle of a signal produced by the sensor. In the remaining part of the duty cycle, some other property of color or shading is demonstrated, depending on the part of the shaft not covered by the image 210. The computing system 130 can be configured or programmed to recognize and process the portion of the duty cycle that was generated by the image 210 and to ignore the remaining portion of the duty cycle not generated by the image 210.

Furthermore, other types of images are possible for generating optical signals that have different characteristics depending on the direction of rotation and thus can be used to determine a direction of rotation. In other embodiments, an image that is color coded, rather than grayscale, can be used to achieve the same purposes. For example, a color image can be used that is a first color at one end 220 and a second color at the other end 230 with a gradual transition between the colors in between the two ends. As another example, a color image could be used that is varying shades of a given color that is a first shade at one end 220 and a second shade at the other end 230 with a gradual transition between shades in between the two ends.

As another example, two different images can be used—a first image that is one color and a second image that is a second color. In this example, if the images are placed less than 180 degrees apart around the circumference of a shaft, readings taken from an optical sensor 120 can be used to determine the direction of rotation. In one embodiment, for example, one image is red and another image is blue and these images are placed 90 degrees apart around the circumference of a shaft. If the computing system 130 coupled to the optical sensor 120 determines that red is followed closely thereafter by blue followed by a long pause (corresponding to 270 degrees with no red or blue) in a repeating pattern, then it is determined that the shaft is rotating in one direction. On the other hand, if it is determined that blue is followed closely thereafter by red followed by a long pause (corresponding to 270 degrees with no red or blue) in a repeating pattern, then it is determined that the shaft is rotating in a different direction. As such, it should be recognized that the image could be stepped instead of simply graduated.

A graduated image, such as the gray scale image 210 in FIG. 2, can be applied to pre-existing equipment operating in the field in a straightforward manner. For example, the image 210 can be a narrow strip having a width of, for example, only one or a few centimeters in width. When, for example, the image is a sticker, it can be attached to a shaft in a fairly small area, and a sensor 120, such as an optical sensor, can be placed in close enough proximity to the image 210 to record accurate grayscale values versus time. A graduated image, such as the gray scale image 210, can also be placed on a shaft 110 during manufacturing of equipment that includes the shaft 110. Similarly, the other example images described earlier can be applied to pre-existing equipment operating in the field or can be placed on a shaft 110 during manufacturing in a straightforward manner.

Figure 4:
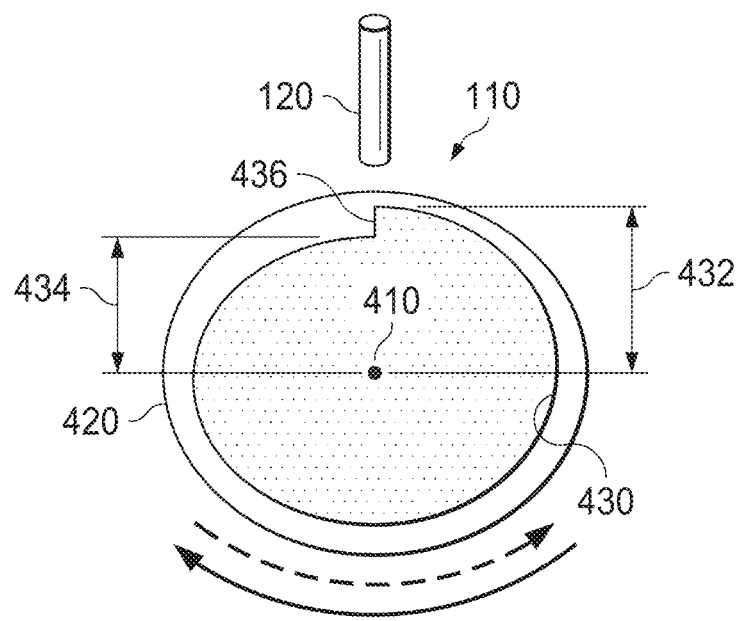
FIG. 4 is a cross-sectional view of an exemplary embodiment of a shaft having a gradually varying radius in accordance with one exemplary aspect of the present disclosure.

FIG. 4 illustrates a cross-sectional view of an exemplary embodiment of a shaft 110 having a gradually varying radius about a centerline or axis though the point designated by 410. In an embodiment, the axis of rotation passes through the center point 410. The boundary 420 represents the outer circumference of the shaft 110. As can be seen, a portion of the shaft has been machined away to form a boundary 430 having a radius that is less than the radius of the outer circumference of the shaft 110. A clockwise rotation is indicated by the solid curved arrow and a counter-clockwise rotation is indicated by the dashed curved arrow. In FIG. 4, the shaft surface includes a gradient between a first height 432 and a second height 434, wherein the gradient is oriented along the circumference of the shaft 110. The difference between the first height 432 and the second height 434 is defined by the step 436.

The shaft 110 has the boundary indicated by the surface 430 in a small length of the shaft 110 and a remainder of the shaft is defined by the boundary 420 (i.e., the shaft 110 is generally cylindrical). That is, the shaft 110 has a cylindrical surface for at least a portion of its length, and in this embodiment has a portion of its length that is machined to have a cross section as shown in FIG. 4. In an embodiment, the boundary 430 is localized to an area of sensing. With respect to the displacement sensor 120, the distance between the displacement sensor 120, which is fixed in place, and the portion of the boundary 430 directly underneath the displacement sensor 120 increases or decreases gradually while the shaft rotates. Detecting or monitoring this change in distance over time provides an indication of direction of rotation. For example, if the shaft is rotating in a clockwise direction, the distance between the sensor 120 and the shaft boundary 430 decreases gradually over time until the step 436 passes the sensor 120, causing an abrupt change of distance as measured by the sensor 120. On the other hand, if the shaft is rotating in a counter-clockwise direction, the distance between the sensor 120 and the shaft boundary 430 increases gradually over time until the step 436 passes the sensor 120 causing an abrupt change in distance as measured by the sensor 120.

Figure 5:
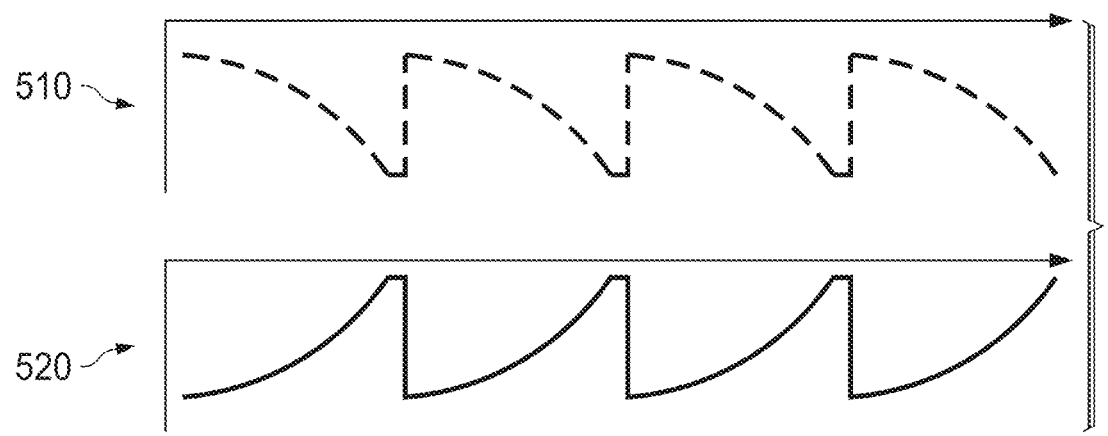
FIG. 5 illustrates exemplary signals generated by a sensor for the embodiment in FIG. 4 in accordance with one exemplary aspect of the present disclosure.

Referring now to FIG. 5, exemplary signals generated by the sensor 120 in FIG. 4 are illustrated. The signals illustrated in diagrams 510 and 520 show example voltage or current or similar signals versus time. The signal in diagram 510 is an example signal generated by a counter-clockwise rotation of the shaft 110, and the signal in diagram 520 is an exemplary signal generated by a clockwise rotation of the shaft 110.

For automated detection of direction of rotation, a control module, such as computing system 130, can be used to detect the rate of change of distance between sensor 120 and boundary 430 to determine direction of rotation. For example, the computing system 130 can determine whether the signal output from the displacement sensor 120 looks more like the signal in 510 or in 520. Depending on the direction of rotation, the signal output from displacement sensor 120 will show a distinct increasing or decreasing signal trend over time (not including the step changes).

Figure 6A:
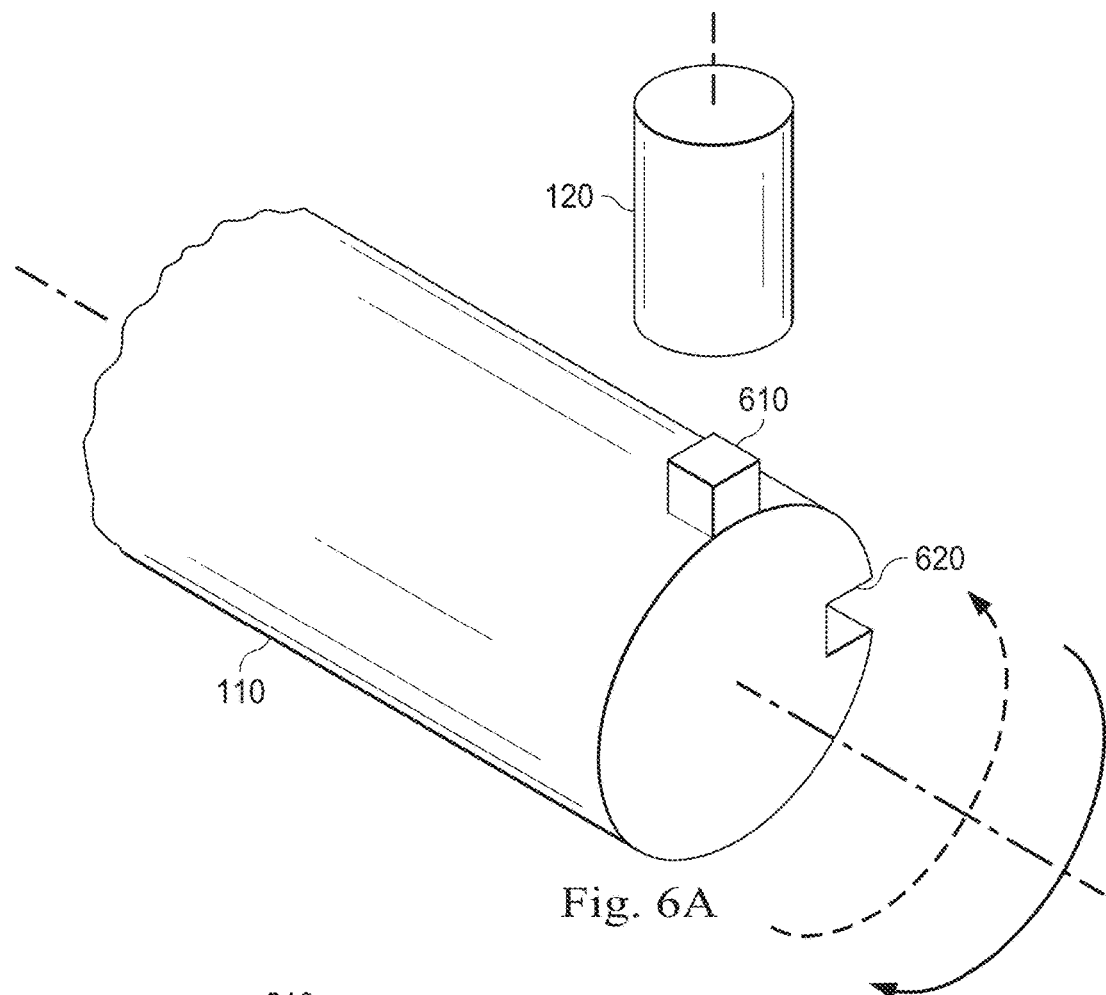
FIGS. 6A and 6B illustrate a perspective view and a cross-sectional view, respectively, of an exemplary embodiment of a shaft in accordance with one exemplary aspect of the present disclosure.

FIG. 6A illustrates a perspective view of an exemplary embodiment of a shaft 110 having two elevational features 610 and 620 located on an outer circumference of the shaft 110. In an embodiment, the features 610 and 620 are localized to an area of sensing and they do not extend beyond an area of sensing along the length of the shaft 110. In the example shown, the feature 610 is an example protrusion and the feature 620 is an example notch or indentation. Although shown as a protrusion and a notch as illustrative examples, the features 610 and 620 may instead include two notches, indentions, keyways or scratches with different depths on the shaft, or two protrusions with different heights on the shaft, or any combination thereof. If there are distinct differences in distance between displacement sensor 120 and shaft 110 when the features 610 and 620 are rotated under the displacement sensor and the features 610 and 620 are not 180 degrees apart on the circumference, a direction of rotation can be determined.

Figure 6B:
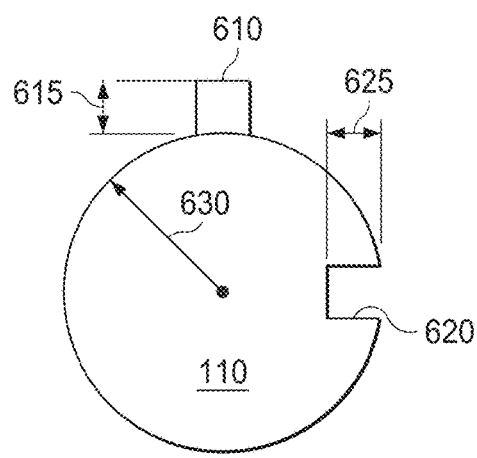

FIG. 6B is a cross-sectional view of the shaft 110 in FIG. 6A taken through the features 610 and 620. In FIG. 6B, the height of the protrusion 610 above the circumference of the shaft 110 is indicated as 615, and the depth of the notch below the circumference of the shaft 110 is indicated as 625. A reference depth of notches and a reference height of protrusions are defined by a circle traced by a radius, such as radius 630, that specifies a circumference of the shaft 110. The axis of rotation of the shaft 110 runs through the center point of the radius. The width of the two features 610 and 620 can be the same or different, but the widths are typically confined to a small area on the circumference of the shaft 110.

At some point during rotation of the shaft 110, each feature 610 and 620 will appear in the field of measurement of the displacement sensor 120. The displacement sensor 120 can detect these features 610 and 620 when they appear in the field of measurement and provide the ability to differentiate features of the signal produced by the displacement sensor to determine direction of rotation. The exemplary signals illustrated in FIGS. 7A-7C can be used to determine direction of rotation.

Figure 7A:
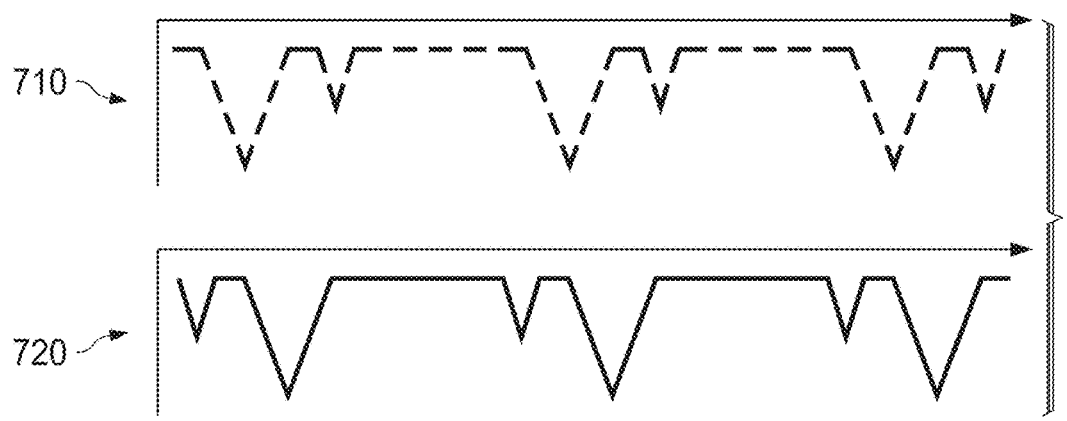
FIGS. 7A, 7B and 7C are exemplary signals generated for different surface features of a shaft that can be used to determine direction of rotation in accordance with one exemplary aspect of the present disclosure.

The signals illustrated in FIG. 7A are for an embodiment in which the features 610 and 620 are both notches with different depths with respect to the radius of the shaft 110. The signals illustrated in diagrams 710 and 720 may represent voltage or current measured versus time by the displacement sensor 120 as a shaft 110 rotates. The signal 710 may represent a counter-clockwise direction of rotation and the signal 720 may represent a clockwise direction of rotation or vice versa. As can be understood, since the signals are different, the computing system 130 can determine the direction of rotation from the signals.

Figure 7B:
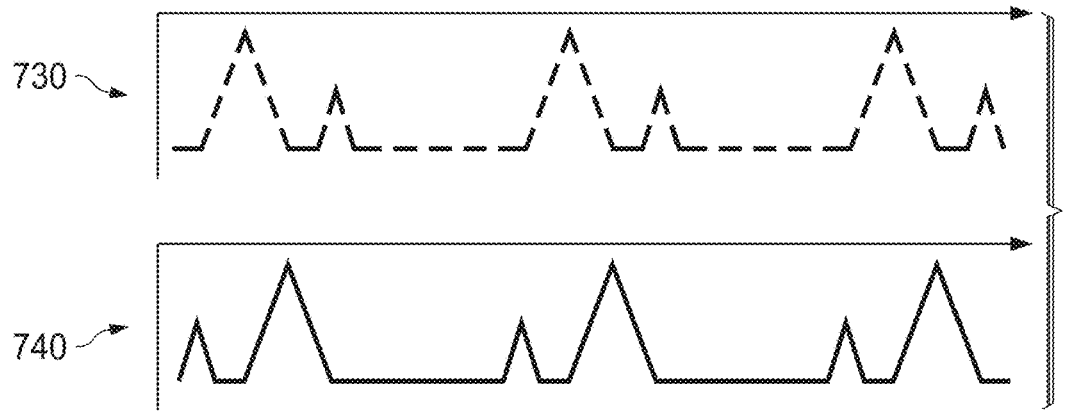

The signals illustrated in FIG. 7B are for an embodiment in which the features 610 and 620 are both protrusions with different heights with respect to the circumference of the shaft 110. The signal 730 may represent a counter-clockwise direction of rotation and the signal 740 may represent a clockwise direction of rotation or vice versa.

Figure 7C:
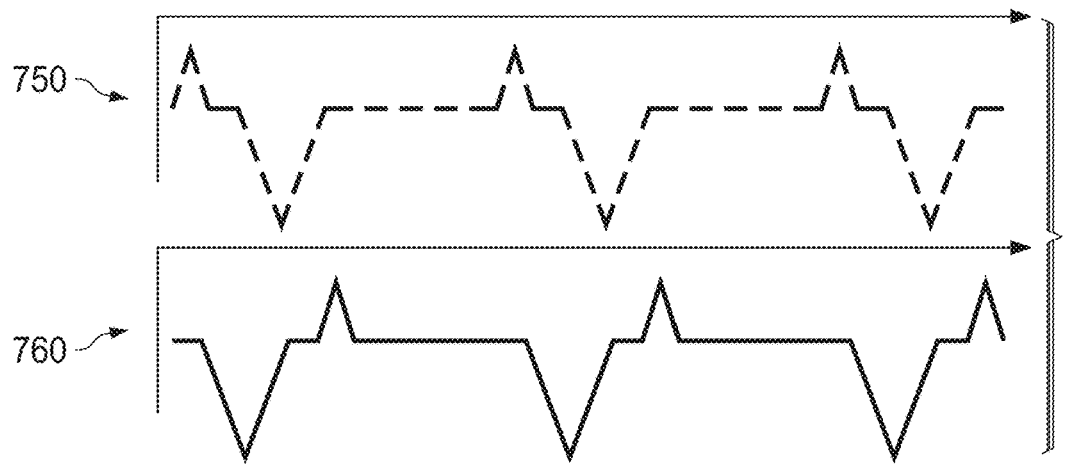

The signals illustrated in FIG. 7C are for an embodiment in which one feature 610 is a protrusion and the other feature 620 is a notch (i.e., the example illustrated in FIGS. 6A and 6B). The signal 750 may represent a counter-clockwise direction of rotation and the signal 760 may represent a clockwise direction of rotation or vice versa.

The shafts 110 discussed above are configured such that only one sensor 120 is typically used to determine a direction of rotation. That is, in many embodiments, only one sensor is used to detect a direction of rotation of a corresponding shaft. Therefore, in many embodiments, the apparatus used to determine a direction of rotation includes no more than one sensor.

Figure 8:
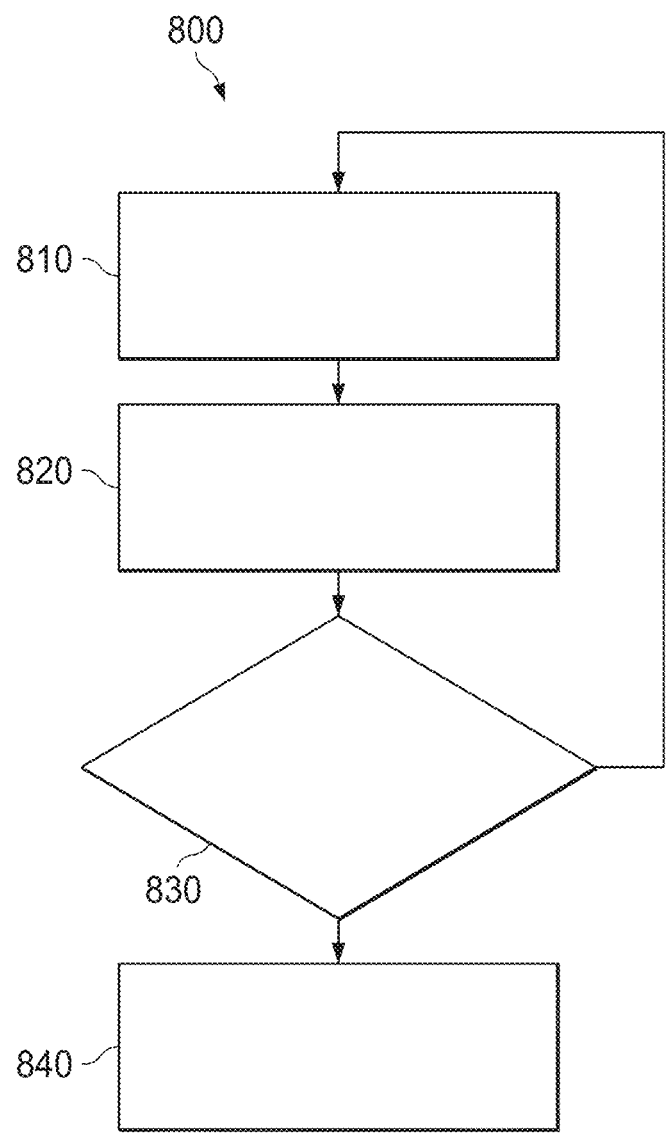
FIG. 8 is a flowchart setting forth an exemplary method for determining a direction of rotation of a shaft in accordance with one exemplary aspect of the present disclosure.

FIG. 8 is a flowchart setting forth an exemplary method 800 for determining a direction of rotation of a shaft that is part of a machine or piece of equipment for delivering power. The method 800 begins in block 810. In block 810 the machine or equipment having a shaft is operated normally to achieve the machine's desired objective. For example, if the machine is a compression system that includes a compressor powered by a motor via a shaft, the motor operates normally to power the compressor. Next in block 820 a signal from a displacement sensor, such as displacement sensor 120, is generated. In block 830, a determination is made using the signal whether the shaft is rotating in a reverse direction (such as a direction opposite of a nominal direction).

In some embodiments, blocks 820 and 830 may be performed by any of the systems described previously. For example, the signal of block 820 may be generated by an optical sensor 120 and a graduated image, such as the gray scale image 210, may be attached to a shaft for the purpose of determining direction of rotation. The optical sensor 120 is coupled to a computing system 130 for performing block 830, and the processor 132 is configured to determine a direction of rotation based on whether the image signal generated by the optical sensor 120 indicates increasing or decreasing shades and/or intensity.

As another example, the signal of block 820 may be generated by a displacement sensor 120, and a shaft may be shaped in a cross-section similar to one of the shafts in FIG. 4, 6A or 6B. The displacement sensor 120 is coupled to a computing system 130 for performing block 830, and the processor 132 is configured to determine a direction of rotation by whether a signal generated by the displacement sensor 120 indicates a distance variation corresponding to one direction of rotation or another.

If the determination is made in block 830 that the shaft is rotating such that equipment including the shaft is operating normally (e.g., the direction of rotation corresponds to normal operation), then the method 800 returns to block 810 and the equipment continues to operate normally. If, however, a determination is made in block 830 that the shaft is rotating in a reverse direction (e.g., a direction that will result in equipment damage or failure), the method 800 proceeds to block 840. In block 840, an action is taken to either alert a human operator or to automatically shut down or isolate the machinery. Exemplary actions include sounding an alarm, providing a visual indicator, isolating the equipment, sending a signal to turn power off to or shut down all or part of a machine powering the shaft, or any combination of these actions.

Embodiments of the invention may include any combinations of the methods and systems shown in the following numbered paragraphs. This is not to be considered a complete listing of all possible embodiments, as any number of variations can be envisioned from the description above.

1. An apparatus for determining a direction of rotation of an object about an axis, the apparatus comprising:
    a sensor having a sensing field and being disposed so that the object is within the sensing field, the sensor being configured to:
    detect variations in optical characteristics of the object as the object rotates; and
    generate a signal based on the detected variations in optical characteristics; and
    a computing system configured to receive the signal from the sensor and to determine a direction of rotation of the object about the axis based on the signal.

2. The apparatus of paragraph 1, further comprising an image having variations of color or shading and circumscribing at least a portion of the object, wherein the sensor is positioned to generate the signal by detecting variations in color or shading in the image as the object rotates.

3. The apparatus of paragraph 2, wherein the image includes a graduated grayscale image having variations in shading in different portions of the image.

4. The apparatus of paragraph 3, wherein in a first direction of rotation of the object the signal indicates a gradual transition from a first shade to a second shade and in a direction opposite of the first direction of rotation the signal indicates a gradual transition from the second shade to the first shade.

5. The apparatus of any of paragraphs 1-4, wherein the computing system is configured to:
    detect an undesired reverse rotation of the object based on the signal from the optical sensor; and
    generate an alert signal in response to detecting the undesired reverse rotation, wherein the sensor is an optical sensor.

6. The apparatus of paragraph 5, wherein the object is a cylindrical shaft, and wherein the alert signal generated in response to detecting the undesired reverse rotation is an alarm signal or a signal for turning off at least part of a device used to provide power to the cylindrical shaft.

7. The apparatus of paragraph 2, wherein the image includes a graduated color image having variations in shading in different portions of the image, and wherein the sensor is the only sensor used for determining the direction of rotation of the object.

8. The apparatus of paragraph 1, further comprising a plurality of images having variations of color or shading between the images and circumscribing at least a portion of the object, wherein the sensor is positioned to generate the signal by detecting variations in color or shading in the plurality of images as the object rotates.

9. A method for determining a direction of rotation of an object, the method comprising:
    detecting, by a sensor, at least one image with variations in optical characteristics disposed on the object, wherein the sensor is positioned to detect the variations in optical characteristics of the at least one image as the object rotates;

generating, by the sensor, a signal indicating variations in optical characteristics of the at least one image as the object rotates;

receiving the signal from the sensor at a computing system; and determining, by the computing system, the direction of rotation of the object based on the received signal.

10. The method of paragraph 9, wherein the at least one image includes a graduated image comprising a gradient between a first level of shading of a first color and a second level of shading of the first color or of a second color, wherein the first and second color are selected from black, white, and colors of the visible, infrared or ultraviolet spectrums, and wherein the gradient is oriented along a circumference of the object.

11. The method of paragraph 9 wherein, in a first direction of rotation of the object, the signal indicates a gradual transition from a first level of shading to a second level of shading, and wherein, in a second direction of rotation that is opposite of the first direction of rotation, the signal indicates a gradual transition from the second level of shading to the first level of shading.

12. The method of any of paragraphs 9-11, wherein one of the first and second directions of rotation is a reverse rotation of the object, and wherein the method further comprises:
  detecting the reverse rotation; and
  generating an alert signal in response to detecting the reverse rotation.

13. The method of paragraph 12, wherein the object is a cylindrical shaft, wherein the sensor is an optical sensor, and wherein the alert signal generated in response to detecting reverse rotation is an alarm signal or a signal for turning off at least part of a device used to provide power to the shaft.

14. A reverse rotation detection apparatus comprising:
  an object having a surface whose height with respect to an axis of rotation varies radially in a portion of the surface, wherein the portion of the surface comprises a gradient between a first height and a second height, and wherein the gradient is oriented along the circumference of the object;
  a sensor positioned to generate a signal indicative of the distance between the sensor and the surface of the object as the object rotates about the axis of rotation; and
  a computing system configured to receive the signal from the sensor and configured to determine a direction of rotation of the object based on a pattern of differences in distance between the sensor and the surface of the object as the object rotates, as indicated by the signal.

15. The reverse rotation detection apparatus of paragraph 14, wherein the object is a cylindrical object, wherein the signal varies gradually as the object rotates between the first height and the second height until there is an abrupt change at a boundary between the first height and the second height, and wherein the sensor is the only sensor in the reverse rotation detection apparatus used to determine the direction of rotation of the object.

16. The reverse rotation detection apparatus of paragraphs 14 or 15, wherein the computing system is further configured to generate an alert signal in response to detecting an undesired direction of rotation.

17. A reverse rotation detection apparatus comprising:
  an object having a surface comprising a first feature and a second feature, wherein the first feature and the second feature are aligned in a cross section of the object and located on a surface of the object less than 180 degrees apart in the cross section;
  a sensor positioned to generate a signal indicative of a distance between the sensor and the surface of the object as the object rotates, wherein a distance between the first feature and the sensor when the first feature is in a field of measurement of the sensor is different than a distance between the second feature and the sensor when the second feature is in the field of measurement of the sensor; and
  a computing system configured to receive the signal from the sensor and configured to determine a direction of rotation of the object based on a pattern of differences in distance between the sensor and the surface of the object as the object rotates, as indicated by the signal.

18. The apparatus of paragraph 17, wherein the sensor is a displacement sensor, wherein the object is a cylindrical object, wherein the first feature is a first protrusion of a first height above the circumference of the object, wherein the second feature is a second protrusion of a second height above the circumference of the object, and wherein the first height is different than the second height.

19. The apparatus of paragraph 17, wherein the sensor is a displacement sensor, wherein the object is a cylindrical object, wherein the first feature is a protrusion above the circumference of the object, and wherein the second feature is a notch below the circumference of the object.

20. The apparatus of paragraph 17, wherein the sensor is a displacement sensor, wherein the object is a cylindrical object, wherein the first feature is a first notch of a first depth below the circumference of the object, and wherein the second feature is a second notch of a second depth below the circumference of the object, and wherein the first depth is different than the second depth.

21. The apparatus of any of paragraphs 17-20, wherein the sensor is the only sensor in the reverse rotation detection apparatus used to determine a direction of rotation of the object.

While the present techniques may be susceptible to various modifications and alternative forms, the embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

The invention claimed is:

1. An apparatus for determining a direction of rotation of an object about an axis, the apparatus comprising:
  a sensor having a sensing field and being disposed so that the object is within the sensing field, the sensor being configured to
  detect variations in optical characteristics of the object as the object rotates about the axis, and
  generate a signal based on the detected variations in optical characteristics; and
  a computing system configured to receive the signal from the sensor and to determine a direction of rotation of the object about the axis based on the signal.

2. The apparatus of claim 1, further comprising an image having variations of color or shading and circumscribing at least a portion of the object, wherein the sensor is positioned to generate the signal by detecting variations in color or shading in the image as the object rotates.

3. The apparatus of claim 2, wherein the image includes a graduated grayscale image having variations in shading in different portions of the image.

4. The apparatus of claim 3, wherein in a first direction of rotation of the object the signal indicates a gradual transition from a first shade to a second shade and in a direction opposite of the first direction of rotation the signal indicates a gradual transition from the second shade to the first shade.

5. The apparatus of claim 1, wherein the object is a cylindrical shaft and the sensor is an optical sensor, and wherein the computing system is configured to:
detect an undesired reverse rotation of the object based on the signal from the sensor; and
generate an alert signal in response to detecting the undesired reverse rotation, wherein the alert signal is a signal for turning off at least part of a device used to provide power to the cylindrical shaft.

6. The apparatus of claim 2, wherein the image includes a graduated color image having variations in shading in different portions of the image, and wherein the sensor is the only sensor used for determining the direction of rotation of the object.

7. The apparatus of claim 1, further comprising a plurality of images having variations of color or shading between the images and circumscribing at least a portion of the object, wherein the sensor is positioned to generate the signal by detecting variations in color or shading between the plurality of images as the object rotates.

8. A method for determining a direction of rotation of an object, the method comprising:
detecting, by a sensor, at least one image with variations in optical characteristics disposed on the object, wherein the sensor is positioned to detect the variations in optical characteristics of the at least one image as the object rotates;
generating, by the sensor, a signal indicating variations in optical characteristics of the at least one image as the object rotates;
receiving the signal from the sensor at a computing system; and
determining, by the computing system, the direction of rotation of the object based on the received signal.

9. The method of claim 8, wherein the at least one image includes a graduated image comprising a gradient between a first level of shading of a first color and a second level of shading of the first color or of a second color, wherein the first and second color are selected from black, white, and colors of the visible, infrared or ultraviolet spectrums, and wherein the gradient is oriented along a circumference of the object.

10. The method of claim 8 wherein, in a first direction of rotation of the object, the signal indicates a gradual transition from a first level of shading to a second level of shading, and wherein, in a direction opposite of the first direction of rotation, the signal indicates a gradual transition from the second level of shading to the first level of shading.

11. The method of claim 8, wherein the object is a cylindrical shaft and the sensor is an optical sensor, and wherein one of the first and second directions of rotation is a reverse rotation of the cylindrical shaft, and wherein the method further comprises:
detecting the reverse rotation; and
generating an alert signal in response to detecting the reverse rotation, the alert signal comprising a signal for turning off at least part of a device used to provide power to the cylindrical shaft.

12. A reverse rotation detection apparatus comprising:
an object having a surface whose height with respect to an axis of rotation varies radially in a portion of the surface, wherein the portion of the surface comprises a gradient between a first height and a second height, and wherein the gradient is oriented along the circumference of the object;
a sensor positioned to generate a signal indicative of the distance between the sensor and the surface of the object as the object rotates about the axis of rotation; and
a computing system configured to receive the signal from the sensor and configured to determine a direction of rotation of the object based on a pattern of differences in distance between the sensor and the surface of the object as the object rotates, as indicated by the signal.

13. The reverse rotation detection apparatus of claim 12, wherein the object is a cylindrical object, wherein the signal varies gradually as the object rotates between the first height and the second height until there is an abrupt change at a boundary between the first height and the second height, and wherein the sensor is the only sensor in the reverse rotation detection apparatus used to determine the direction of rotation of the object.

14. The reverse rotation detection apparatus of claim 12, wherein the object is a cylindrical shaft, and wherein the computing system is further configured to generate an alert signal in response to detecting an undesired direction of rotation, the alert signal being a signal for turning off at least part of a device used to provide power to the cylindrical shaft.

15. A reverse rotation detection apparatus comprising:
an object having a surface comprising a first feature and a second feature, wherein the first feature and the second feature are aligned in a cross section of the object and located on a surface of the object less than 180 degrees apart in the cross section;
a sensor positioned to generate a signal indicative of a distance between the sensor and the surface of the object as the object rotates, wherein a distance between the first feature and the sensor when the first feature is in a field of measurement of the sensor is different than a distance between the second feature and the sensor when the second feature is in the field of measurement of the sensor; and
a computing system configured to receive the signal from the sensor and configured to determine a direction of rotation of the object based on a pattern of differences in distance between the sensor and the surface of the object as the object rotates, as indicated by the signal.

16. The apparatus of claim 15, wherein the sensor is a displacement sensor, wherein the object is a cylindrical object, wherein the first feature is a first protrusion of a first height above the circumference of the object, wherein the second feature is a second protrusion of a second height above the circumference of the object, and wherein the first height is different than the second height.

17. The apparatus of claim 15, wherein the sensor is a displacement sensor, wherein the object is a cylindrical object, wherein the first feature is a protrusion above the circumference of the object, and wherein the second feature is a notch below the circumference of the object.

18. The apparatus of claim 15, wherein the sensor is a displacement sensor, wherein the object is a cylindrical object, wherein the first feature is a first notch of a first depth below the circumference of the object, and wherein the second feature is a second notch of a second depth below the circumference of the object, and wherein the first depth is different than the second depth.

19. The apparatus of claim 15, wherein the sensor is the only sensor in the reverse rotation direction apparatus used to determine a direction of rotation of the object.

* * * * *